(12) United States Patent
Saldarini (10) Patent No.: US 11,649,569 B2
(45) Date of Patent: May 16, 2023

(54) METHOD FOR FILLING A FILLABLE PORTION OF A GARMENT TO BE PADDED AND PADDED GARMENT

(71) Applicant: TRUST MONTI FONTI, Como (IT)

(72) Inventor: Francesco Saldarini, Como (IT)

(73) Assignee: TRUST MONTI FONTI, Como (IT)

( * ) Notice: Subject to any disclaimer, the term of this patent is extended or adjusted under 35 U.S.C. 154(b) by 0 days.

(21) Appl. No.: 15/414,304

(22) Filed: Jan. 24, 2017

(65) Prior Publication Data
US 2017/0211209 A1 Jul. 27, 2017

(30) Foreign Application Priority Data

Jan. 26, 2016 (IT) .......................... 102016000007608

(51) Int. Cl.
*D01G 15/82* (2006.01)
*D01G 9/06* (2006.01)
(Continued)

(52) U.S. Cl.
CPC ............ *D01G 15/825* (2013.01); *A41D 3/00* (2013.01); *A41D 31/00* (2013.01); *A47G 9/0207* (2013.01); *B32B 5/06* (2013.01); *B32B 5/26* (2013.01); *B32B 9/02* (2013.01); *D01G 9/06* (2013.01); *D01G 9/08* (2013.01); *D01G 15/16* (2013.01); *D01G 15/74* (2013.01); *D01G 21/00* (2013.01); *D04H 1/4266* (2013.01); *D04H 1/50* (2013.01);
(Continued)

(58) Field of Classification Search
CPC .......................................... D01G 15/00–15/98
See application file for complete search history.

(56) References Cited

U.S. PATENT DOCUMENTS 371,913 A * 10/1887 Archer ..................... D01G 9/00
19/88
524,650 A * 8/1894 Potter ....................... D01G 9/00
19/93
(Continued)

FOREIGN PATENT DOCUMENTS

| EP | 0 892 095 A1 | 1/1999 |
| JP | 2002-345614 A | 12/2002 |
| WO | 2011/045085 A1 | 4/2011 |

OTHER PUBLICATIONS

Italian Search Report for corresponding Italian Patent Application No. 102016000007608 dated Oct. 5, 2016, 8 pgs.

*Primary Examiner* — Bao-Thieu L Nguyen
(74) *Attorney, Agent, or Firm* — Volpe Koenig (57) ABSTRACT

A method is for filling a fillable portion of a garment to be padded to obtain a padded garment, such as a garment or blanket. A cashmere fiber mass is fed towards a carding station. The cashmere fiber mass is mechanically opened and blended in the carding station by a carding machine to obtain a staple cashmere fiber. The staple cashmere fiber exiting from the carding station is fed towards a beating station. The staple cashmere fiber is cleaned in the beating station by cleaning air flow adapted to cross and inflate the staple cashmere fiber to remove residual impurities and dust from the staple cashmere fiber. The staple cashmere fiber exiting from the beating station is fed towards an injecting station and injected into the fillable portion by a pusher for introducing the staple cashmere fiber into the fillable portion to obtain the padded garment.

16 Claims, 3 Drawing Sheets

(51) Int. Cl.
*D01G 15/16* (2006.01)
*D01G 15/74* (2006.01)
*D01G 9/08* (2006.01)
*D01G 21/00* (2006.01)
*A41D 3/00* (2006.01)
*A41D 31/00* (2019.01)
*A47G 9/02* (2006.01)
*B32B 5/06* (2006.01)
*B32B 5/26* (2006.01)
*B32B 9/02* (2006.01)
*D04H 1/4266* (2012.01)
*D04H 1/50* (2012.01)

(52) U.S. Cl.
CPC ...... *A41D 2400/10* (2013.01); *B32B 2250/20* (2013.01); *B32B 2262/02* (2013.01); *B32B 2262/08* (2013.01); *B32B 2307/304* (2013.01); *B32B 2307/732* (2013.01); *B32B 2437/00* (2013.01); *B32B 2601/00* (2013.01)

(56) References Cited

U.S. PATENT DOCUMENTS

| | | | | |
|---|---|---|---|---|
| 802,114 A * | 10/1905 | Reagan | D01G 9/00 | 19/89 |
| 810,898 A * | 1/1906 | Archer | D01G 9/00 | 19/89 |
| 827,604 A * | 7/1906 | Berrry et al. | D01G 9/04 | 19/85 |
| 1,015,764 A * | 1/1912 | Potter | D01G 9/00 | 19/204 |
| 1,311,907 A * | 8/1919 | Munger | D01G 9/00 | 19/38 |
| 1,886,713 A * | 11/1932 | Mitchell | D01G 9/00 | 19/36 |
| 2,076,988 A * | 4/1937 | Garrett | B07B 13/00 | 209/133 |
| 2,139,859 A * | 12/1938 | Schwarze | D01G 9/00 | 19/112 |
| 2,148,184 A * | 2/1939 | Baker | D01G 9/00 | 19/93 |
| 2,224,625 A * | 12/1940 | Henryt | D01G 9/00 | 19/93 |
| 2,420,367 A * | 5/1947 | Geer | D01G 9/04 | 141/67 |
| 2,513,298 A | 7/1950 | Fairbairn | | |
| 2,682,085 A * | 6/1954 | Novotny | D01G 9/00 | 131/110 |
| 2,780,839 A * | 2/1957 | Rusca | D01G 9/00 | 19/202 |
| 2,854,702 A * | 10/1958 | Mace | D01G 9/04 | 19/81 |
| 3,027,604 A * | 4/1962 | Shelburne | D01G 9/00 | 19/202 |
| 3,395,425 A * | 8/1968 | Vinogradov | D01G 15/42 | 19/105 |
| RE26,649 E * | 8/1969 | Reddick | D01G 9/00 | 19/202 |
| 3,579,744 A * | 5/1971 | Menzies, Jr. | D01B 3/00 | 19/105 |
| 4,128,917 A * | 12/1978 | Varga | D01G 15/12 | 19/105 |
| 4,300,267 A * | 11/1981 | Winch | D01G 9/00 | 19/107 |
| 4,507,197 A * | 3/1985 | Koenig | B07B 9/00 | 209/2 |
| 4,761,857 A * | 8/1988 | McFarlane | D01G 9/00 | 19/106 R |
| 5,181,295 A * | 1/1993 | Demuth | D01G 7/10 | 19/200 |
| 5,655,262 A * | 8/1997 | Sterin | D01G 9/06 | 19/114 |
| 5,737,806 A * | 4/1998 | Leifeld | D01G 15/20 | 19/105 |
| 6,058,567 A * | 5/2000 | Roberson | D01G 15/46 | 19/200 |
| 6,330,786 B1 * | 12/2001 | Settle | D02G 3/025 | 19/2 |
| 2006/0024470 A1 * | 2/2006 | Heilman | D04H 1/43835 | 428/34.3 |
| 2008/0072628 A1 * | 3/2008 | Liu | D02G 3/10 | 66/202 |
| 2009/0101294 A1 * | 4/2009 | Young | D01B 1/10 | 162/20 |
| 2013/0174379 A1 * | 7/2013 | Ishino | A61F 13/15707 | 19/98 |
| 2013/0255048 A1 * | 10/2013 | Crary | D06C 11/00 | 28/162 |
| 2014/0304950 A1 * | 10/2014 | Lakshminarayan | D01G 15/40 | 19/100 |
| 2015/0166745 A1 * | 6/2015 | Henry | C08J 5/06 | 536/56 |
| 2016/0145781 A1 * | 5/2016 | Chou | D01F 2/00 | 28/104 |
| 2017/0342603 A1 * | 11/2017 | Wackerzapp | D01G 21/00 | |

\* cited by examiner

METHOD FOR FILLING A FILLABLE PORTION OF A GARMENT TO BE PADDED AND PADDED GARMENT

This application claims benefit of Serial No. 102016000007608, filed 26 Jan. 2016 in Italy and which application is incorporated herein by reference. To the extent appropriate, a claim of priority is made to the above disclosed application.

FIELD OF THE INVENTION

The present invention relates to the industrial field of manufacturing padded garments for clothing, for example padded jackets or padded household linen items, such as a padded blanket.

BACKGROUND

In the field of manufacturing of padded garments, the need to improve the softness and thermal insulation thereof, in addition to the lightness thereof, is increasingly felt.

Goose feathers or down are generally used for filling them, which goose feathers or down are conveniently processed on an industrial level to give them the technical features required to ensure hygiene, duration, thermal insulation capacity and handleability by means of automated machines.

The use of bird feathers, in particular goose feathers, for filling the aforesaid garments has a series of disadvantages.

In particular, the feathers comprise a tough support portion, the so-called quill, and a plurality of fibers that start from the tough support and form the fluffy end part of the feather.

The quill of the feather tends to damage and pierce the fabrics used to make the fillable portions of the padded garments, which are adapted to contain the filling.

Therefore, garments padded with feathers are to use feather-resistant fabrics, so-called "down proof" fabrics.

Maintaining a garment padded with feathers or down is particularly delicate because washings alter the consistency of the staple feathers by bunching them together with subsequent reduction of the thermal insulating power.

Another disadvantage associated with feathers used as a filling is the collection of the feathers themselves from live birds, which may cause traumas thereto and sometimes the death thereof.

Therefore, the need is felt to fill padded garments, for example garments or padded blankets, with a material other than feathers and which simultaneously provides an increased insulating power.

An alternative to feathers is provided by wool, which has the advantage of not injuring the animal but has the disadvantage of having a reduced resistance to repeated washings, which tend to remove the lanolin, which gives the fiber softness, and insulating power.

Therefore, the need is felt to fill a padded garment with another natural material that does not have the aforesaid disadvantages.

An alternative could be the use of cashmere, which is the under woolly layer of goat hair, which generally is used for making yarn for particularly prestigious fabrics.

Cashmere is not used as the filling of a padded garment because it does not have suitable features in its natural form in the beginning, i.e. in the form in which it is provided by manufacturers. Indeed, generally it is provided in compressed bales, often containing impurities.

Therefore, there is a need for a method, which allows processing the cashmere fiber to make it suitable for filling a garment to be padded in place of transforming it into yarn.

SUMMARY OF THE INVENTION

It is an object of the present invention to devise and provide a method that allows meeting the aforesaid needs while at least partially obviating the drawbacks indicated above with reference to the known art.

In particular, it is a task of the present invention to provide a method that allows the fillable portions of a padded jacket or other garment or a blanket to be filled with cashmere fiber.

Moreover, it is a task of the present invention to provide a padded garment, e.g. a padded jacket or blanket, which avoids worsening its properties of thermal insulating power, lightness and softness following repeated washings.

Moreover, it is an object of the present invention to provide a new use of cashmere fiber to meet the aforesaid needs.

It is another object of the present invention to provide a plant for filling a fillable portion of a garment to be padded with cashmere fiber flakes in order to obtain a padded garment, which meets the aforesaid needs.

These and further objects and advantages are achieved by means of a method, a padded garment, a filling plant, and use thereof.

Further objects, solutions and advantages are achieved in the embodiments hereinafter described.

BRIEF DESCRIPTION OF THE DRAWINGS

The invention is disclosed below by describing certain embodiments thereof, by way of a non-limiting example, with reference to the accompanying drawings, in which.

DESCRIPTION OF THE PREFERRED EMBODIMENTS

Figure 1:
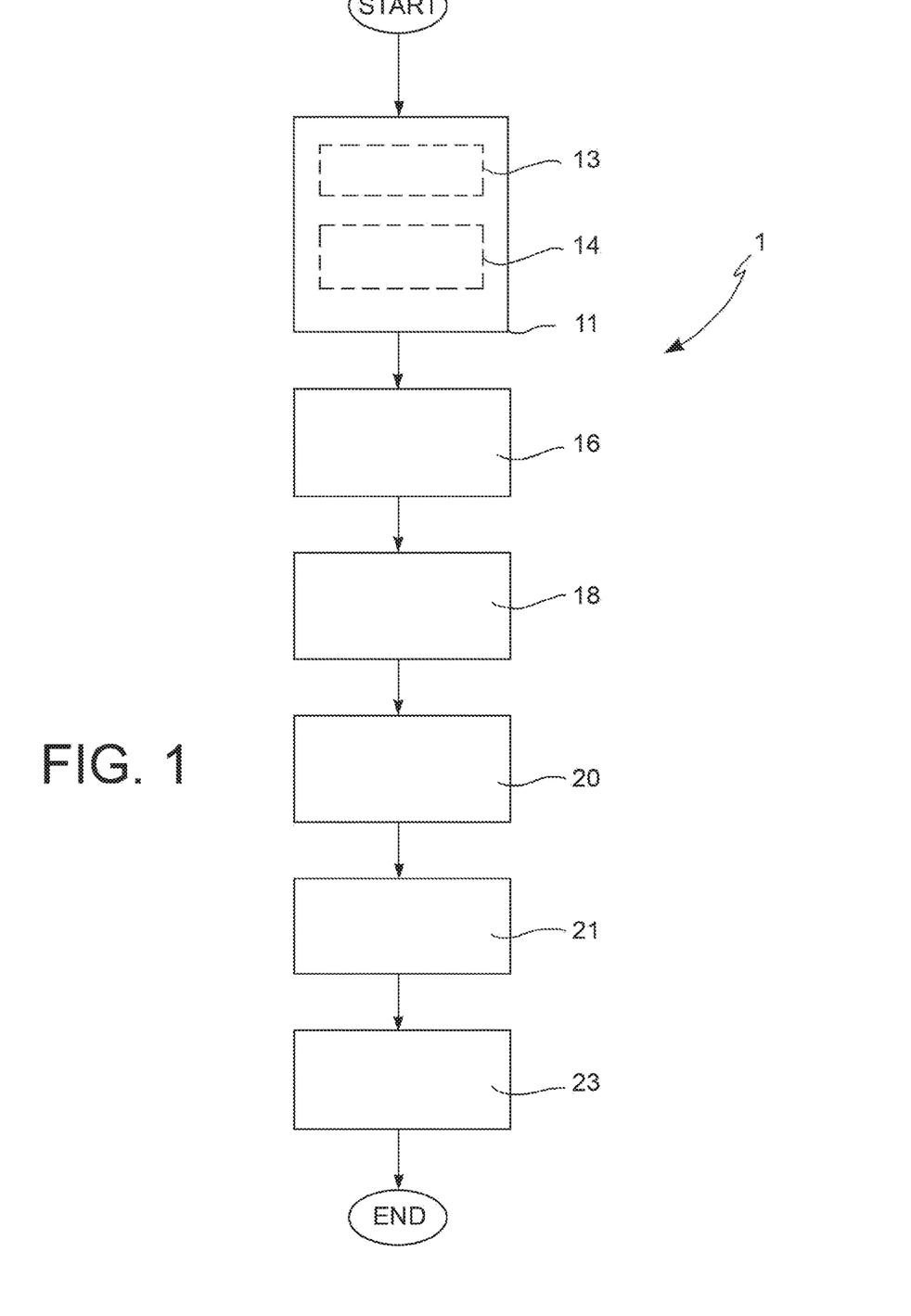
FIG. 1 shows a diagrammatic flow diagram relating to the filling method according to the invention.

With reference to FIG. 1, a method for filling a garment to be padded in order to obtain a padded garment according to the invention is indicated as a whole with numeral 1.

Finable portion 24 of padded garment 25 means a portion of the garment formed between an inner layer and an outer layer of the padded garment, which are preferably joined to each other along joining lines, e.g. by stitching, to form a bag, or a bag portion. Such layers are for example textile layers, for example natural fabric or synthetic fabric. In other words, the fillable portions are bag-like portions.

According to the present invention, the fillable portions are filled with a filling material which comprises, or is formed by, cashmere fiber flakes. Method 1 preferably applies to a garment, e.g. a padded jacket, for example shown in FIG. 5, or to a padded blanket, for example shown in FIG. 4, or to a household linen item in general.

The method comprises a step of providing 11 a cashmere fiber mass 10 to be fed towards an opening station 15.

The method further comprises a step of mechanically opening and blending 16 the cashmere fiber mass 10 in the a opening station 15 by means of an opening machine 27.

Figure 3:
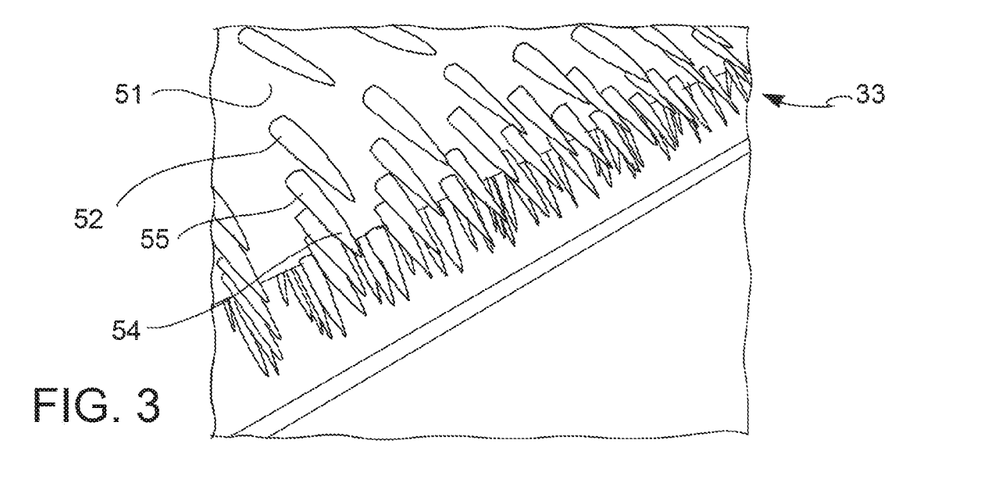
FIG. 3 shows a partial detail of a rotating drum of an opening machine of the plant in FIG. 2.

According to an embodiment, the opening machine 27 comprises a rotating drum 33 defining an outer rotating drum side surface 51 and a plurality of sharp spikes 52 projecting outwards from said outer side surface 51.

The opening machine 27 is described in a more detailed manner below in the present description, in particular with reference to a filling plant according to the invention.

The method further comprises a step of feeding 18 the cashmere fiber flakes 17 exiting from said opening station 15 towards a beating station 19.

Moreover, the method comprises a step of subjecting said cashmere fiber flakes 17 to a cleaning step 20 in said beating station 19 by means of a cleaning air flow 45 adapted to cross and inflate the cashmere fiber flakes 17 to remove residual impurities and dusts 41 from the cashmere fiber flakes 17.

This cleaning step 20 in the beating station 19 is particularly advantageous since it gives the cashmere fiber flakes 17 a particularly soft and swollen texture.

The cleaning air flow 45 through the fiber cashmere previously treated by the opening station 15, surprisingly separates and distances the cashmere fiber flakes 17 each other, providing them with a consistency much more fluffy, and with a softness and a bulkiness, which are much higher with respect to those of the cashmere fiber flakes 17 exiting from the opening station 15.

The cleaning step 20 in the beating station 19 therefore allows providing a cashmere fiber flake material, which is actually suitable for filling fillable portions 24 of a garment or a blanket, in order to produce a padded garment or a padded blanket, thanks to its softness and bulkiness.

The method further comprises a step of feeding 21 the cashmere fiber flakes 17 exiting from the beating station 19 towards a filling station 22.

Moreover, the method comprises a step of inserting 23 the cashmere fiber flakes 17 exiting from the beating station 9 into said fillable portion 24 in order to obtain said padded garment 25.

According to an embodiment, the insertion step 23 is carried out in a filling station 22 by means of push injection means 29 for introducing the cashmere fiber flakes 17 into said fillable portion 24.

According to an embodiment, the step of providing 11 a cashmere fiber mass comprises a step of subjecting the cashmere fiber mass 10 to a preventive cleaning step 13 in a preventive beating station 12 arranged upstream of said carding station 15, by means of an air flow 40 adapted to cross the cashmere fiber mass 10 to remove impurities from said cashmere fiber 10, and a step of feeding 14 the cashmere fiber mass 10 exiting from said preventive beating station 12 towards the opening station 15.

The material exiting from this preventive cleaning step 13 therefore is substantially devoid of coarse impurities. The successive cleaning step 20 in the beating station 19 instead is adapted to remove further, less coarse impurities and dusts, which could have been separated from the cashmere fiber in the opening step 15, from the cashmere fiber flakes 17. Moreover, the cleaning step 20 in the beating station 19 provides the above mentioned advantageous effects of providing the cashmere fiber flakes 17 with a consistency which is much fluffier, softer and a bulkier with respect to the cashmere fiber flakes exiting from the opening station.

According to an embodiment, the air flow 40 is generated by blade air blowers, i.e. such means comprise a blow device adapted to generate a concentrated air flow along an elongated linear cross section. Such a device generates a high speed air flow capable of penetrating between the fibers of the cashmere mass thus inflating them, and of crossing it while dragging the impurities out of the fiber mass.

Figure 2:
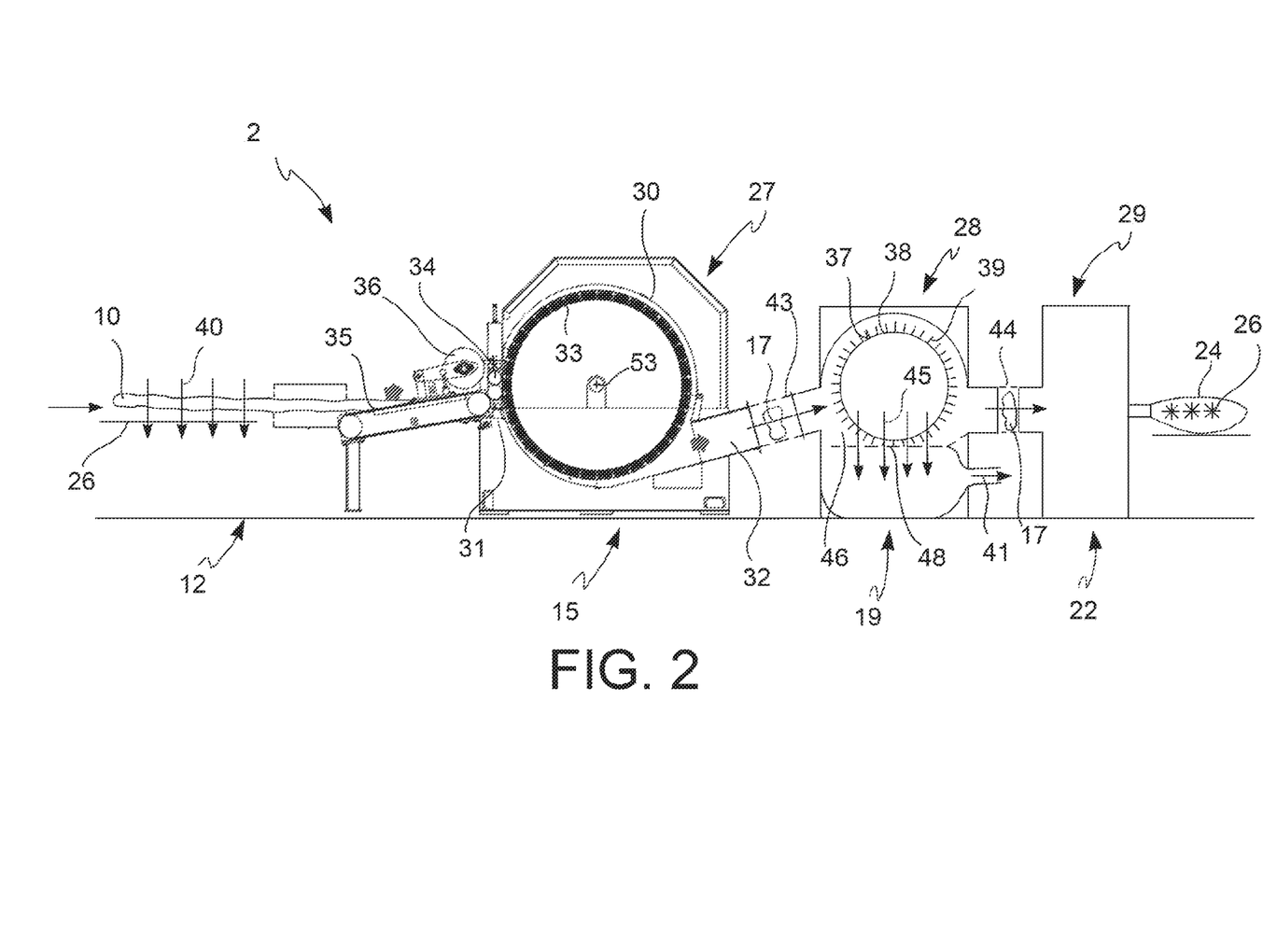
FIG. 2 diagrammatically shows a filling plant which applies the method in FIG. 1.

According to an embodiment, upstream of the opening machine 27, the cashmere fiber mass 10 is passed through feeding rollers 34 pressed against one another and rotated at a predetermined speed to feed the cashmere mass 10 towards the rotating drum 33 so that the cashmere fiber mass 10 may be attacked by the rotating drum 33.

According to an embodiment, the feeding rollers 34 are rotated at a predetermined lower speed than the rotation speed of the rotating drum 33 of the opening machine 27.

Thereby, the feeding rollers 34 form a tightening system 31 for the incoming cashmere fiber mass 10, which compresses such a cashmere fiber mass therebetween while holding the cashmere fiber mass 10 while it is penetrated by the needles of drum 33 to maximize the separating action of the cashmere fibers. In other words, the feeding rollers 34 form a pinching device of the cashmere fiber mass 10.

According to an embodiment, the feeding rollers 34 are two feeding rollers 34.

According to an embodiment, the feeding rollers 34 have a grooved side surface for efficiently holding the cashmere fiber mass therebetween.

According to an embodiment, the cashmere mass 10 is passed through a conveyor belt 35 and an inlet pressure roller 36, upstream of the rotating feeding rollers 34.

The inlet pressure roller 36 is pressed against said conveyor belt 35 in order to compact the cashmere fiber mass 10 before it reaches the feeding rollers 34.

According to an embodiment, the beating station 19 comprises a beating chamber 46 through which the cashmere fiber flakes 17 is passed, and a beating rotating drum 37 rotatably arranged inside the beating chamber 46.

The beating station 19 is very advantageous as far the consistency of the cashmere fiber flakes exiting from it, since it provide the fiber flakes with a fluffier consistence and a definitely higher softness and bulkiness with respect to the fiber flakes entering the beating station.

The beating rotating drum 37 defines a drum outer side surface 38, e.g. a substantially cylindrical surface, provided with a plurality of needles and spikes 39 projecting from the outer side surface 38 and arranged so as to penetrate the cashmere fiber flakes 17 during the rotation of the beating rotating drum 37 to further open the fiber flakes and remove further impurities and dusts 41.

According to an embodiment, the beating rotating drum 37 is cylindrical in shape and has a diameter of about 600 mm.

The cleaning air flow 45 is arranged to act in conjunction with the beating rotating drum 37.

According to an embodiment, the cleaning air flow 45 is obtained by suctioning air through the beating chamber 46 in order to remove said impurities and dust 41.

According to an embodiment, the beating station 19 comprises a grille 48 interposed between the beating rotating drum 37 and an outlet of said beating chamber 46, said grille 48 being adapted to be crossed by the cleaning air flow 45 thus allowing the impurities and dusts to pass while preventing the cashmere fiber flakes 17 from passing.

According to an embodiment, the push injection means 29 for introducing the cashmere fiber flakes 17 into the fillable portion 24 comprise an air blow device for channeling an air blow towards the inside of the fillable portion 24, thus pushing the cashmere fiber flakes.

According to an embodiment, the push injection means 29 for introducing the cashmere fiber flakes 17 into the fillable portion 24 comprise a reciprocating cylinder system having an outlet for the cashmere fiber flakes 17 for channeling the cashmere fiber flakes towards the inside of the fillable portion 24. For example, the reciprocating cylinder system is actuated pneumatically.

This type of push injection means allows avoiding interferences caused by the air flow during the injection step, and allows inserting very small amounts of fiber into a garment to be padded made of poorly breathing fabric.

According to another aspect of the invention, the objects and advantages mentioned are met by a padded garment comprising at least one fillable portion 24 of padded garment and a padding filling 26 contained in said at least one fillable portion 24, in which said filling 26 comprises cashmere fiber flakes 17.

According to an embodiment, the padded garment is for example a garment.

Figure 5:
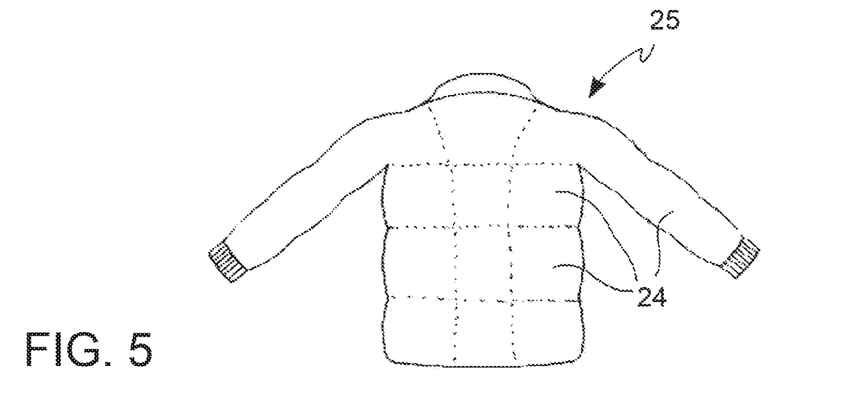
FIG. 5 shows another example of padded garment according to the invention, in particular a padded jacket.

According to a preferred embodiment, the padded garment is a padded jacket, for example shown in FIG. 5.

Figure 4:
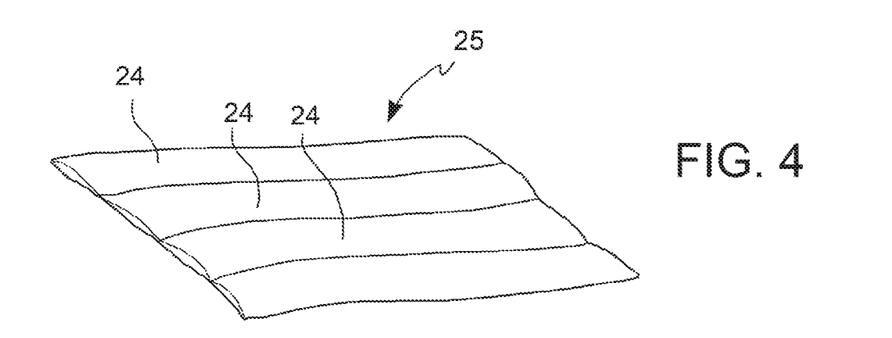
FIG. 4 shows an example of padded garment according to the invention, in particular a padded blanket.

The padded garment may also be a padded blanket, for example as shown in FIG. 4, or a household linen item in general.

According to an embodiment, the padded garment, e.g. the padded jacket, is obtained by filling a fillable portion 24 of the garment to be padded by means of the above-described method 1.

The padded jacket, for example shown in FIG. 5, comprises an inner layer adapted to be arranged, in use, facing a user, and an opposite outer layer adapted to be facing outwards in use, and which externally covers the inner layer. The inner layer and outer layer are jointed to each other, for example by stitching, at least along the edges, thus forming with each other one or more fillable portions 24 filled with a filling material adapted to thermally isolate the user from the external ambient. Further stitchings can be provided adapted to form a plurality of fillable portions containing the filling material.

According to the present invention, the filling material comprises, or is formed by, cashmere fiber flakes.

According to an embodiment, the padded jacket is filled by means of the aforesaid filling method.

According to a further aspect of the invention, with reference to FIG. 2, the objects and advantages mentioned are met by a plant 2 for filling a fillable portion 24 of a garment to be padded with cashmere fiber flakes 17 to obtain a padded garment 25, for example a garment or a padded blanket or a household linen item, comprising a opening station 15 comprising a opening machine 27 adapted to receive an incoming cashmere fiber mass 10 and to open said cashmere fiber mass to provide exiting cashmere fiber flakes 17.

According to an embodiment, the opening machine 27 comprises a rotating drum 33 defining an outer rotating drum side surface 51 and a plurality of sharp spikes 52 projecting outwards from said outer side surface 51.

According to an embodiment, the opening machine 27 comprises a stripping chamber 30 having an inlet mouth 31 for the cashmere fiber mass 10 and an outlet mouth 32 for the cashmere fiber flakes 17, in which the rotating drum 33 is interposed between the inlet mouth 31 and the outlet mouth 32.

The sharp spikes 52 are arranged to penetrate and open the cashmere fibers 10 introduced into the rotating drum 33 by means of the rotating movement of the rotating drum 33 with respect to the incoming cashmere fiber mass 10.

According to an embodiment, the outer side surface 51 of the rotating drum 33 is a substantially cylindrical surface. The rotating drum 33 may rotate around axis 53 of such a cylindrical outer side surface 51.

The spikes 52 are preferably distributed along the outer side surface 51 of the rotating drum 33.

According to an embodiment, the spikes 52 extend in a radial direction with respect to axis 53 of the cylindrical surface.

According to an embodiment, the spikes 52 comprise a substantially conical end portion 54 and, according to an embodiment, they also comprise a substantially cylindrical base portion 55 interposed between said outer side surface 51 and the end portion 54.

Moreover, plant 2 comprises a beating station 19 adapted to be crossed by said cashmere fiber flakes 17, comprising means for providing an air flow 45 to cross the cashmere fiber flakes 17 to remove residual impurities and dust 41 from the cashmere fiber flakes 17.

Plant 2 further comprises means for feeding the cashmere fiber flakes 17 from the opening station 15 to the beating station 19.

Moreover, plant 2 comprises a filling station 22 for introducing the cashmere fiber flakes 17 into the fillable portion 24.

Plant 2 further comprises means for feeding said cashmere fiber flakes 17 from said beating station 19 to said filling station 22.

According to an embodiment, the filling station 22 comprises push injection means 29 for introducing the cashmere fiber flakes 17 into said fillable portion 24.

According to an embodiment, the push injection means 29 for introducing the cashmere fiber flakes 17 into said fillable portion 24 comprise an air blow device for channeling an air blow towards the inside of the fillable portion 24, thus pushing said cashmere fiber flakes.

According to an embodiment, the push injection means 29 comprise a reciprocating cylinder system having an outlet for the cashmere fiber flakes 17, for channeling the cashmere fiber flakes towards the inside of the fillable portion 24.

According to an embodiment, the plant 2 comprises a preventive beating station 12 arranged upstream of the opening station 15, adapted to be crossed by a cashmere fiber mass 10, comprising means for providing an air flow adapted to cross the cashmere mass 10 in order to remove impurities from said cashmere fiber mass, and means for feeding the cashmere fiber mass 10 exiting from such a preventive beating station 12 up to the opening station 15.

According to another aspect of the invention, the objects and advantages mentioned are met by the use of cashmere fiber flakes 17 for filling a fillable portion 24 of a garment to be padded in order to obtain a padded garment 25, for example a garment or a blanket or a household linen item.

According to one embodiment of the present invention, the aforesaid cashmere fiber is Hircus goat hair, preferably hair from the undercoat of Hircus goat.

Advantageously, the combination of the step of mechanically opening, inflating and blending 16 the cashmere fiber mass 10 by means of a opening machine 27 and the step of injecting 23 the cashmere fiber flakes 17 into the fillable portion 24 by means of push means 29 for introducing the cashmere fiber flakes 17 into the fillable portion 24, allows to make the padded garment with 100% cashmere fiber flakes. In other words, such a method allows manufacturing a padded jacket or blanket or other padded item, which is exclusively filled with cashmere fiber flakes instead of with feathers or down, for example goose feathers or down.

Moreover, the use of cashmere fiber flakes for filling a padded garment, for example a garment or a blanket or a household linen item or the like, results in a variety of advantages, among which the following.

An advantage of using cashmere fiber flakes as a filling, for example obtained by means of the above-described method, is eliminating the escape of filling material from the stitchings of the fillable portions of the padded garment, which would cause a gradual emptying of the fillable portions and a subsequent impoverishment of the insulating power of the padded garment. Conversely, a feather filling has this disadvantage.

Another advantage in using cashmere fiber flakes as a filling eliminating the damage, for example, micro holes and holes, from the fabric forming the fillable portions of the padded garment. Conversely, if feathers were used, the quills of the feather, being tougher than the softer part of the feather or down, would wear out the fabric forming the fillable portions, thus piercing it.

Therefore, the cashmere fiber flakes allows fillable portions of padded garments to be made of not necessarily of feather-resistant fabric, so-called "down proof", i.e. allows the use of more delicate, lightweight and comfortable fabrics A further advantage in using cashmere fiber flakes with respect to other filling materials such as feather or down or wool, is an increased thermal insulation and an increased lightness of the padded garment.

In particular, the use of Hircus goat cashmere is particularly advantageous because the undercoat of the Hircus goat consists of a host of soft, fine fibers having a diameter around 14.5 μm, which are concentrated in a reduced volume and forming several small gaps occupied by air. The presence of an increased concentration of gaps occupied by the air provides an increased insulating power, thus substantially reducing the thermal osmosis. The Hircus goat has naturally developed this ability to resist in a particularly hostile environment, with rigid winters and scorching summers.

An advantage of garments padded with cashmere fiber flakes is keeping its thermal properties of softness and lightness in the long-term, even after several washings. Such garments even become softer after several washings.

Conversely, a wool filling has the disadvantage of becoming matted with washings because the washings tend to remove the lanolin from the wool fiber, lanolin being a greasy substance which impregnates and naturally protects the wool by waterproofing it.

With respect to using feathers or down as a filling, the softness and qualities of the cashmere fiber improve with washings, when washing staple feathers alters the consistency thereof by bunching them with one another and accordingly reducing the insulating power.

The use of cashmere advantageously allows washing the padded garment in water, while avoiding the matting, which is typical of wool fiber.

Another important advantage of using cashmere fiber flakes instead of goose down is that the collection of cashmere fiber is a harmless natural process for the animals from which it is collected by shearing. Contrarily, plucking birds often causes their death.

Those skilled in the art may make several changes and adaptations to the above-described embodiments, and replace elements with others, which are functionally equivalent in order to meet contingent needs, without departing from the scope of the following claims.

All the features described above as belonging to a possible embodiment may be implemented independently on the other embodiments described.

All the features herein described and/or any step of the method herein described may be combined according to any combination, except the combinations in which at least some of such features and/or steps mutually exclude each other.

Moreover, the drawings are not to scale, but importance is generally given to the illustration of the principles of the present invention.

The invention claimed is:

1. A method for filling a fillable portion of a garment or blanket in order to obtain a filled garment, or a filled blanket, the method comprising the steps of:
providing a cashmere fiber mass to be fed towards an opening station of an opening machine;
mechanically opening and blending the cashmere fiber mass in said opening station to obtain staple cashmere fiber;
feeding said staple cashmere fiber exiting from said opening station towards a beating station;
cleaning said staple cashmere fiber while beating same in said beating station, by cleaning air flow adapted to cross and inflate the staple cashmere fiber to remove residual impurities and dust from the staple cashmere fiber;
feeding the inflated staple cashmere fiber exiting from said beating station towards a filling station; and
inserting the inflated staple cashmere fiber into said fillable portion so as to obtain said filled garment or said filled blanket, in said filling station.

2. The method according to claim 1, wherein the inserting step is carried out by a push injector for introducing the inflated staple cashmere fiber into said fillable portion.

3. The method according to claim 1, wherein said step of providing a cashmere fiber mass comprises the steps of: subjecting said cashmere fiber mass to a preventive cleaning step in a preventive beating station arranged upstream of said opening station, by an air flow adapted to cross the cashmere fiber mass to remove impurities from said cashmere fiber mass; feeding said cashmere fiber mass exiting from said preventive beating station towards the opening station.

4. The method according to claim 1, wherein the opening machine comprises a rotating drum defining an outer rotating drum side surface and a plurality of needles and sharp spikes projecting outward from said outer side surface and wherein upstream of said opening machine, the cashmere fiber mass is passed through rotating feeding rollers pressed against one another and rotated at a speed lower than the rotation speed of the rotating drum.

5. The method according to claim 4, wherein upstream of the rotating feeding rollers, the cashmere fiber mass is passed through a conveyor belt and an inlet pressure roller, said pressure roller being pressed against said conveyor belt to compact the cashmere fiber mass before said cashmere fiber mass reaches the feeding rollers.

6. The method according to claim 1, wherein said cleaning step comprises passing the staple cashmere fiber through a beating chamber comprising a beating rotating drum which defines an outer side surface provided with a plurality of needles and spikes projecting from the outer side surface and arranged to penetrate the staple cashmere fiber when the beating rotating drum rotates to open the staple cashmere fiber and remove impurities and dusts.

7. The method according to claim 6, wherein said cleaning air flow is obtained by suctioning air through the beating chamber to remove said impurities and dust, to obtain staple cashmere fiber having a swollen texture.

8. A plant for filling a fillable portion of a garment or a blanket to be filled with staple cashmere fiber to obtain a filled garment, or a filled blanket, comprising:
an opening station comprising an opening machine adapted to receive an incoming cashmere fiber mass and to provide exiting staple cashmere fiber;
a beating station adapted to be crossed by said staple cashmere fiber, comprising a flow generator for providing an air flow adapted to cross said staple cashmere fiber, while the fiber is being beaten, to remove residual impurities and dust from said staple cashmere fiber, and inflate the staple cashmere fiber;
a feeder for feeding said staple cashmere fiber from said carding station to said beating station; and
a filling station for introducing the staple cashmere fiber into said fillable portion, a passage for feeding said staple cashmere fiber from said beating station to said filling station.

9. The plant according to claim 8, wherein the filling station comprises push injecting means for introducing the inflated staple cashmere fiber into said fillable portion.

10. The plant according to claim 9, wherein said push injecting means for introducing the inflated staple cashmere fiber into said fillable portion comprise an air blow device for channeling an air blow towards an inside of the fillable portion by pushing said inflated staple cashmere fiber into said fillable portion, or a reciprocating cylinder system having an outlet for the inflated staple cashmere fiber for channeling the inflated staple cashmere fiber towards the inside of the fillable portion.

11. The plant according to claim 8, comprising: a preventive beating station adapted to be crossed by said cashmere fiber mass, comprising means for providing air flow adapted to cross and inflate said cashmere fiber mass to remove impurities from said cashmere fiber mass; a further passage for feeding said cashmere fiber mass from said preventive beating station to said opening station.

12. The plant, according to claim 8, wherein the opening machine comprises a rotating drum defining an outer rotating drum side surface and a plurality of needles and spikes projecting outwards from said outer side surface.

13. A method for filling a fillable portion of a garment or a blanket in order to obtain a filled garment, or a filled blanket, comprising the steps of:
A) providing a cashmere fiber mass to be fed towards an opening station of an opening machine;
B) mechanically opening and blending the cashmere fiber mass in said opening station to obtain staple cashmere fiber;
C) feeding said staple cashmere fiber exiting from said opening station towards a beating station;
D) cleaning said staple cashmere fiber, while beating same in said beating station, by cleaning air flow adapted to cross the staple cashmere fiber to remove residual impurities and dust from the staple cashmere fiber, and inflate the staple cashmere fiber to obtain inflated staple cashmere fiber;
E) feeding the inflated staple cashmere fiber exiting from said beating station towards a filling station; and
F) inserting the inflated staple cashmere fiber into said fillable portion so as to obtain said filled garment, in said filling station,
wherein step D is carried out using a beating rotating drum comprising a plurality of needles and spikes arranged to penetrate the staple cashmere fiber while the staple cashmere fiber is crossed by the cleaning air flow.

14. A method for filling a fillable portion of a garment or a blanket to be filled in order to obtain a filled jacket, or a filled blanket, comprising the steps of:
A) providing a cashmere fiber mass to be fed towards an opening station of an opening machine;
B) mechanically opening and blending the cashmere fiber mass in said opening station to obtain staple cashmere fiber;
C) feeding said staple cashmere fiber exiting from said opening station towards a beating station;
D) cleaning said staple cashmere fiber, while beating same in said beating station, by cleaning air flow adapted to cross the staple cashmere fiber to remove residual impurities and dust from the cashmere fiber flakes, and inflate the staple cashmere fiber to obtain inflated staple cashmere fiber;
E) feeding the inflated staple cashmere fiber exiting from said beating station towards a filling station; and
F) inserting the inflated staple cashmere fiber into said fillable portion so as to obtain said filled garment, in said filling station,
wherein step D is carried out by providing a grid interposed between the beating rotating drum and the outlet of the beating chamber, said grid being crossed by the cleaning air flow while preventing the staple cashmere fiber and the inflated staple cashmere fiber from going through the grid.

15. A plant for filling a fillable portion of a garment or a blanket to be filled with staple cashmere fiber to obtain a filled garment, or a filled blanket, comprising:
an opening station comprising an opening machine adapted to receive an incoming cashmere fiber mass and to provide exiting staple cashmere fiber;
a beating station adapted to be crossed by said staple cashmere fiber, comprising a flow generator for providing an air flow adapted to cross said staple cashmere fiber, while the staple cashmere fiber is being beaten, to remove residual impurities and dust from said staple cashmere fiber, and inflate the staple cashmere fiber to obtain inflated staple cashmere fiber, the beating station comprising a beating rotating drum provided with a plurality of needles and spikes arranged to penetrate the staple cashmere fiber, and the flow generator is arranged to direct the air flow so as to cross the staple cashmere fiber while the staple cashmere fiber is penetrated by the needles and spikes;
a feeder for feeding said staple cashmere fiber from said opening station to said beating station; and
a filling station for introducing the inflated staple cashmere fiber into said fillable portion, a passage for feeding said inflated staple cashmere fiber from said beating station to said filling station.

16. A plant for filling a fillable portion of a garment or a blanket to be filled with cashmere fiber flakes to obtain a filled garment, or a filled blanket, comprising:
an opening station comprising an opening machine adapted to receive an incoming cashmere fiber mass and to provide exiting staple cashmere fiber;
a beating station adapted to be crossed by said staple cashmere fiber, comprising a flow generator for providing an air flow adapted to cross said staple cashmere fiber, while the staple cashmere fiber is being beaten, to remove residual impurities and dust from said staple cashmere fiber, and inflate the staple cashmere fiber to obtain inflated staple cashmere fiber, the beating station comprising a grid interposed between the beating rotating drum and the outlet of the beating chamber, said grid being crossed by the cleaning air flow while preventing the staple cashmere fiber and the inflated staple cashmere fiber from going through the grid;

a feeder for feeding said staple cashmere fiber from said opening station to said beating station; and a filling station for introducing the inflated staple cashmere fiber into said fillable portion, a passage for feeding said inflated staple cashmere fiber from said beating station to said filling station.

* * * * *